United States Patent
Pande et al.

(10) Patent No.: US 12,423,081 B2
(45) Date of Patent: Sep. 23, 2025

(54) APPLICATION DISCOVERY AND DATA CONFIDENCE FABRIC (DCF) OVERLAY

(71) Applicant: Dell Products L.P., Round Rock, TX (US)

(72) Inventors: Pankaj Pande, Carlingford (AU); Stephen J. Todd, North Andover, MA (US)

(73) Assignee: Dell Products L.P., Round Rock, TX (US)

( * ) Notice: Subject to any disclaimer, the term of this patent is extended or adjusted under 35 U.S.C. 154(b) by 133 days.

(21) Appl. No.: 18/194,726

(22) Filed: Apr. 3, 2023

(65) Prior Publication Data

US 2024/0329965 A1    Oct. 3, 2024

(51) Int. Cl.
G06F 8/65 (2018.01)
G06F 9/445 (2018.01)
G06F 16/901 (2019.01)

(52) U.S. Cl.
CPC ............ G06F 8/65 (2013.01); G06F 9/44526 (2013.01); G06F 16/9024 (2019.01)

(58) Field of Classification Search
None
See application file for complete search history.

(56) References Cited

U.S. PATENT DOCUMENTS

| | | | |
|---|---|---|---|
| 7,539,869 B1 | 5/2009 | Mullan et al. | |
| 8,595,484 B2 | 11/2013 | Thomas et al. | |
| 10,757,111 B1 | 8/2020 | Marek et al. | |
| 10,986,076 B1 | 4/2021 | Bendickson et al. | |
| 2005/0044356 A1 | 2/2005 | Srivastava et al. | |
| 2009/0144807 A1 | 6/2009 | Zheng | |
| 2010/0031027 A1 | 2/2010 | Thomas et al. | |
| 2014/0126573 A1 | 5/2014 | Matthews et al. | |
| 2015/0007271 A1 | 1/2015 | Wong et al. | |
| 2016/0191325 A1 | 6/2016 | Pacella et al. | |
| 2020/0104527 A1* | 4/2020 | Koster | G06F 21/6245 |
| 2020/0233978 A1 | 7/2020 | Sofia | |
| 2020/0382560 A1* | 12/2020 | Woolward | H04L 63/205 |
| 2021/0306256 A1 | 9/2021 | Ward et al. | |

(Continued)

FOREIGN PATENT DOCUMENTS

WO    WO-2023043598 A1 *    3/2023    ......... H04L 63/1425

OTHER PUBLICATIONS

Dartois et al., "Tracking Application Fingerprint in a Trustless Cloud Environment for Sabotage Detection," IEEE, 2019, 9pg. (Year: 2019).*

(Continued)

*Primary Examiner* — Ryan D. Coyer
(74) *Attorney, Agent, or Firm* — Workman Nydegger (57) ABSTRACT

One example method includes determining that an application is running on a node of a data confidence fabric; performing an investigation to determine if the application is new to the data confidence fabric; when it is determined that the application is new to the data confidence fabric, generating an update comprising metadata that identifies the application and the node on which the application is running; and automatically deploying, to the node of the data confidence fabric, an application-specific plug-in configured to annotate data received from the application that was determined to be new to the data confidence fabric.

20 Claims, 5 Drawing Sheets

(56) References Cited

U.S. PATENT DOCUMENTS

| | | |
|---|---|---|
| 2021/0406248 A1 | 12/2021 | Todd |
| 2022/0086781 A1 | 3/2022 | Kwon et al. |
| 2022/0100858 A1 | 3/2022 | Todd |
| 2022/0100879 A1* | 3/2022 | Todd .................. G06F 16/2379 |
| 2022/0138325 A1 | 5/2022 | Todd et al. |
| 2023/0004913 A1 | 1/2023 | Reineke et al. |
| 2023/0077354 A1 | 3/2023 | Moon et al. |
| 2023/0104424 A1 | 4/2023 | Diachina et al. |
| 2023/0164174 A1* | 5/2023 | Heller ................. H04L 63/0823 726/23 |
| 2023/0247040 A1* | 8/2023 | Luttwak .................. H04L 63/20 726/22 |
| 2024/0031376 A1* | 1/2024 | Lichtenstein ........... H04L 63/14 |

OTHER PUBLICATIONS

Priebe et al., "CloudSafetyNet: Detecting Data Leakage between Cloud Tenants," ACM, 2014, 12pg. (Year: 2014).*
Todd, Steve, "Project Alvarium: The Future of Edge Data," Dell, 2020, 39pg. (Year: 2020).*
Yao et al., "A trust management framework for software-defined network applications," Wiley, 2018, 18pg. (Year: 2018).*
S. J. Patil al et., CLBNSRM—Confidence Level Based Unblend Neighbor Selection & Blend Node Report Based Optimized Route Formation in Manet, March 2020, International Journal of Computer Networks & Communications (IJCNC) vol.12, No.2, pp. 109-129 (Year: 2020).

* cited by examiner

APPLICATION DISCOVERY AND DATA CONFIDENCE FABRIC (DCF) OVERLAY

FIELD OF THE INVENTION

Embodiments of the present invention generally relate to data confidence fabrics (DCF). More particularly, at least some embodiments of the invention relate to systems, hardware, software, computer-readable media, and methods, for discovering applications in a DCF, and deploying DCF logic to the discovered applications to enable those applications to process data according to the DCF logic.

BACKGROUND

As interest in data confidence fabrics continues to increase, a variety of problems have been encountered in attempting to implement DCF functionality. For example, the process of "overlaying" a DCF onto a DCF-capable edge, or other, ecosystem may be complex/time-consuming, as the user or customer may have to manually insert DCF SDK invocations into each of the applications in connection with which the DCF functionality is to be implemented. This can be especially problematic in an ecosystem that is large and has many applications running at its various nodes.

Moreover, there is presently no known approach for overlaying DCF functionality on top of an ecosystem, such as a network, that takes into consideration that a set of pre-existing applications are running in that ecosystem. Correspondingly, there is no known approach that also accounts for the possibility that the pre-existing applications belong to a vertical, or a use case, with which DCF is already familiar.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data confidence fabrics (DCF). More particularly, at least some embodiments of the invention relate to systems, hardware, software, computer-readable media, and methods, for discovering applications in a DCF, and deploying DCF logic to the discovered applications to enable those applications to process data according to the DCF logic.

In one embodiment, an application discovery process, which may comprise intercepting and analyzing data packets received from an application, may be performed at a node. As part of the application discovery process, the node may generate metadata identifying the application from which the data was received. This metadata may be sent by the node to a service which may then update a DCF capabilities graph to reflect that the application is present and running in the DCF. In an embodiment, the DCF capabilities graph may identify the particular node(s) where the newly discovered application is running. Thus, the DCF capabilities graph may identify all applications, and the nodes on which the applications are running, in the DCF. With this information, a DCF plugin specific to the newly discovered application may be pushed out to the node(s) where the newly discovered application is running so as to enable that application to process data, such as by annotating the data with confidence metadata, according to requirements and parameters specified by the DCF plugin.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that an application new to a DCF may be automatically onboarded to the DCF to perform DCF functions with respect to data handled by that application. An embodiment may avoid the need to manually insert DCF SDK invocations into each new application coming online in a DCF. An embodiment may enable creation and maintenance of a DCF-wide perspective with respect to the applications running on the nodes of the DCF. Various other advantages of one or more embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such method processes, and operations, are defined as being computer-implemented.

A. ASPECTS OF AN EXAMPLE ARCHITECTURE AND ENVIRONMENT

The following is a discussion of aspects of example operating environments for various embodiments of the invention. This discussion is not intended to limit the scope of the invention, or the applicability of the embodiments, in any way. In general, embodiments of the invention may be implemented in connection with systems, software, and components, that individually and/or collectively implement, and/or cause the implementation of, a data confidence fabric (DCF).

Figure 1:
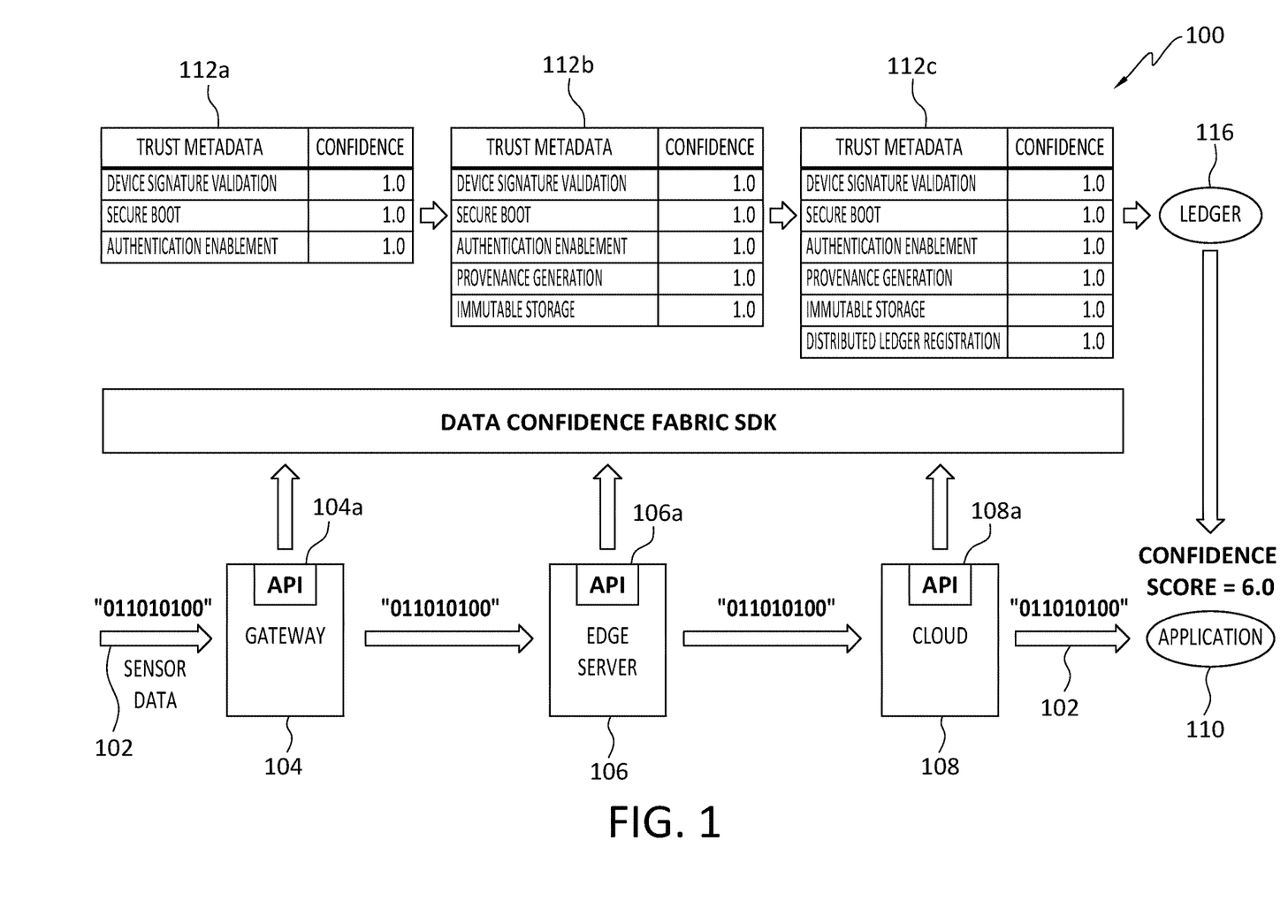
FIG. 1 discloses aspects of an example DCF environment in which an embodiment of the invention may be employed.

With reference now to FIG. 1, embodiments of the invention may be implemented in a variety of operating environments, one example of which is a DCF, denoted at 100 in FIG. 1. In general, the DCF 100 may annotate and score any data that flows within it, providing increased confidence to the applications that use that data, such as for analytical purposes for example.

As shown in FIG. 1, the example DCF 100 concerns the context of edge-based use cases, but the scope of the invention is not limited to such cases or contexts. As shown in the example of FIG. 1, data such as sensor data 102 generated by a sensor flows through one or more tiers, or layers, of the DCF. In the illustrated example, the data 102 may flow through nodes such as a gateway 104, edge server 106, and cloud ecosystem 108, and may ultimately be consumed by one or more applications 110. As trusted handling of the data 102, at the nodes of the various layers, occurs during data 102 delivery, respective trust metadata 112a, 112b, and 112c may be associated with the data 102 by those nodes, that is, by the gateway 104, edge server 106, and/or, cloud ecosystem 108. Thus, trust metadata may continue to accumulate as the data 102 passes through the various nodes in its path.

The trust metadata 112a, 112b, and 112c, may comprise, for example, respective confidence scores associated with trust insertion processes performed by the nodes with respect to the data 102. The trust metadata 112a, 112b, and 112c may be associated with the data 102 by respective node APIs (Application Program Interfaces) 104a, 106a, and 108a that communicate with an interface 114 such as an Alvarium SDK (Software Development Kit). After the data 102 has transited the various nodes, the final, comprehensive trust metadata 112c may be entered into a ledger 116 which may make the trust metadata 112c available for use by the applications 110. Note that, in this example, the trust metadata 112c is an accumulation of all the trust metadata respectively added by the gateway 104, edge server 106, and cloud ecosystem 108.

To illustrate with reference to the specific example of FIG. 1, the gateway 104 may annotate, to the data 102, respective trust metadata 112a for each of three different operations. Particularly, the gateway 104 may annotate trust metadata 112a that indicates, among other things: the gateway 104 has successfully validated the signature coming from the device that generated the data 102; the gateway 104 has used a TPM chip to confirm that the BIOS, firmware, or O/S on the gateway 104 was tampered with during boot; and, the gateway 104 is currently running authentication/authorization software to protect the data 102 stream from unwanted inspection or access. With continued reference to the trust metadata, including the trust metadata 112a, a Confidence score of "1.0" means that a trust insertion process, such as the secure boot confirmation for example, operation succeeded, while a score of "0," for example, might indicate that signature validation failed, or was not performed for some reason.

As noted earlier, the DCF metadata, that is, the trust metadata 112a, ultimately arrives at the ledger 116, where a ledger entry may be created that permanently records the contents of the trust metadata 112a table as well as an overall Confidence Score, which is 6.0 in this illustrative example. Note that the equation used to calculate the Confidence Score in the example of FIG. 1 is simply a summation of confidence scores, but other approaches to calculating an overall Confidence Score may alternatively be employed.

A useful aspect of the example DCF 100 is that, as a result of the annotation of trust metadata 112a, 112b, and 112c, the application 110 may have access to additional context about the trustworthiness of the data 102, addressing the problem of potentially untrustworthy or malicious data sources. The problems presented by such data sources are increasingly faced by enterprise customers as they move their business logic closer to non-enterprise, and potentially untrustworthy, data sources at the edge and/or elsewhere. In the example DCF 100, the path of the data 102 may be largely software-dependent, in the sense that data path handling software, which may comprise a respective instance at each of the gateway 104, edge server 106, and cloud ecosystem 108, may call an annotation/scoring API 104a, 106a, and 108a, respectively, and routing software may be provided at these nodes that forwards the annotations along the data path. However, such software dependencies in a DCF, such as the DCF 100 for example, may lead to vulnerabilities in the trustworthiness of the actual DCF metadata, that is, the trust metadata 112a, 112b, and/or 112c, for example. Examples of such potential vulnerabilities are described below.

It is noted that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing. Example embodiments of the invention may be applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

B. ASPECTS OF SOME EXAMPLE EMBODIMENTS

In general, an embodiment of the invention may, possibly automatically, perform application discovery and cataloging of every node of a DCF to enable creation and maintenance of a DCF graph that may present a picture of how data flows from application to application across the nodes of the DCF. Note that as used herein, application 'discovery' is intended to be construed broadly, and discovery of a new application in a DCF may be performed in a variety of ways. By way of example, and not limitation, a new application running in a DCF may be discovered using any one or more of the following processes: methods that involve network packet sniffing, either on the sending node or the receiving node; inspecting local disk traffic for application data; checking a signature on a disk for application information; checking a list of filenames on the node where the application is running to determine that the filenames and/or file extensions correspond to the application; and checking a registry and/or a service catalog to identify applications running on the node. More generally, any process, or group of processes, that are able to determine that a particular application is running in a DCF may be employed in an embodiment of the invention. Thus, the foregoing examples are provided by way of illustration and are not intended to limit the scope of the invention in any way.

Figure 2:
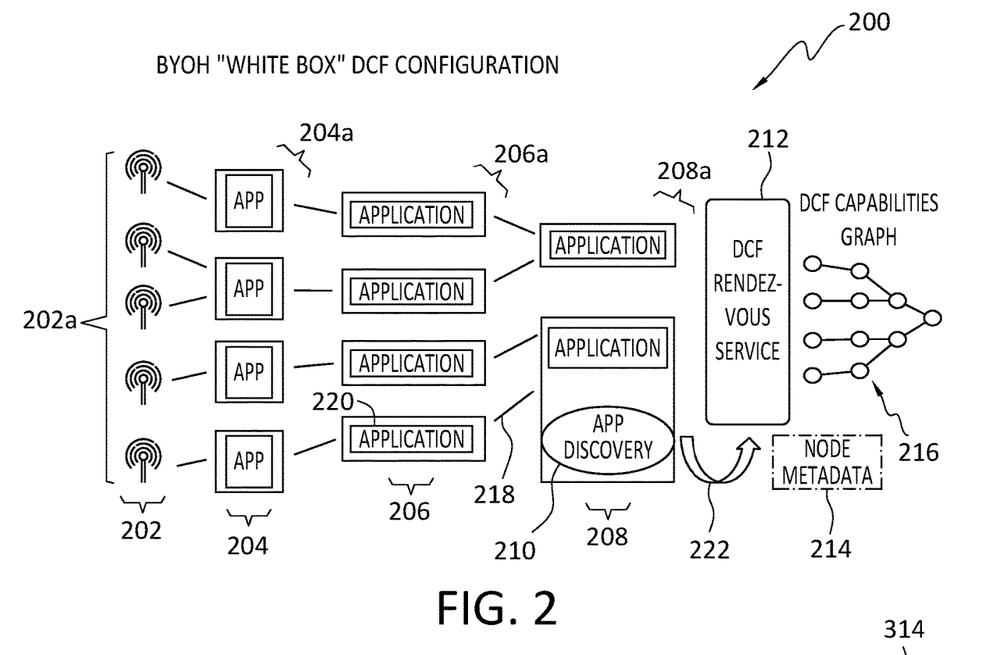
FIG. 2 discloses aspects of an example architecture for application discovery and mapping in a DCF environment.

With reference now to FIG. 2, an example architecture according to one embodiment is disclosed. The architecture may be, or comprise, a DCF 200. As shown, the DCF 200 may comprise a multi-tier configuration that includes, at a lowermost tier 202, a group of devices 202a, such as IoT (internet of things) sensors for example, that may each constitute a respective node of a DCF, and which may generate new/modified data. In an embodiment, one or more of the edge devices 202a may comprise a respective sensor, but that is not necessarily required. As shown, the DCF 200 may comprise a second tier 204, third tier 206, and 'n' tier 208, which may each comprise a respective set of systems/devices 204a, 206a, and 208a, that each constitute a node of the DCF 200. Each of the systems/devices in a tier may host one or more applications. In general, data generated by the devices 202a may flow to one or more of the tiers 204-208 and, specifically, to one or more applications running on the devices 204a, 206a, and 208a, in the tiers 204-208. Further, each of the nodes in the DCF 200 may host a respective instance of an 'App Discovery' application (ADA) 210 that may operate to perform application discovery, as discussed in more detail below.

The instances of an 'App Discovery' application 210 may communicate with a 'DCF Rendezvous Service' (DRS) 212 running in the DCF 200. In general, the DRS 212 may receive, from the instances of the ADA 210, node metadata 214 that identifies new applications discovered by those instances of the ADA 210.

Note that as used herein, a 'new' application refers to an application that may be running in a DCF, but which the DCF may be unaware of. That is, a DCF may be unaware that a particular application, that is, the 'new' application, is running on one or more nodes of the DCF and, as such, the application may be 'new' from the perspective of the DCF when the DCF first discovers that application. Through a discovery process, examples of which are disclosed herein, the DCF may become aware that the 'new' application is running in the DCF, and the DCF may likewise determine which node(s) of the DCF the application is running on.

The DRS 212 may use the node metadata 214 to generate, and maintain, a DCF Capabilities Graph (DCG) 216. In general, the DCG 216 may comprise a map of all nodes in the DCF, and the applications running on those nodes. The DCG 216 may thus provide an overview of the capabilities, at least in terms of the applications running, of the DCF 200.

In more detail, and with continued reference to the example of FIG. 2, an instance of the ADA 210 may intercept traffic 218, such as data packets, received from an application 220. The ADA 210 may inspect the intercepted data to identify the workload, that is, to identify the application 220 that transmitted the traffic 218, and transmit an update 222, which may comprise the node metadata 214, to the DRS 212. The DRS 212 may use the node metadata 214 to update the DCG 216. For example, and as discussed in more detail below with regard to FIG. 3, the DRS 212 may update the DCG 216 to indicate that the node that sent the intercepted traffic 218 is running the application 220. Note that in an embodiment, the DCF 200 may already have the right template or configuration settings to configure itself by inserting appropriate DCF insertion points for a newly discovered application so as to enable that application to perform DCF operations, such as confidence metadata annotations, with respect to data that it receives and/or sends.

Figure 3:
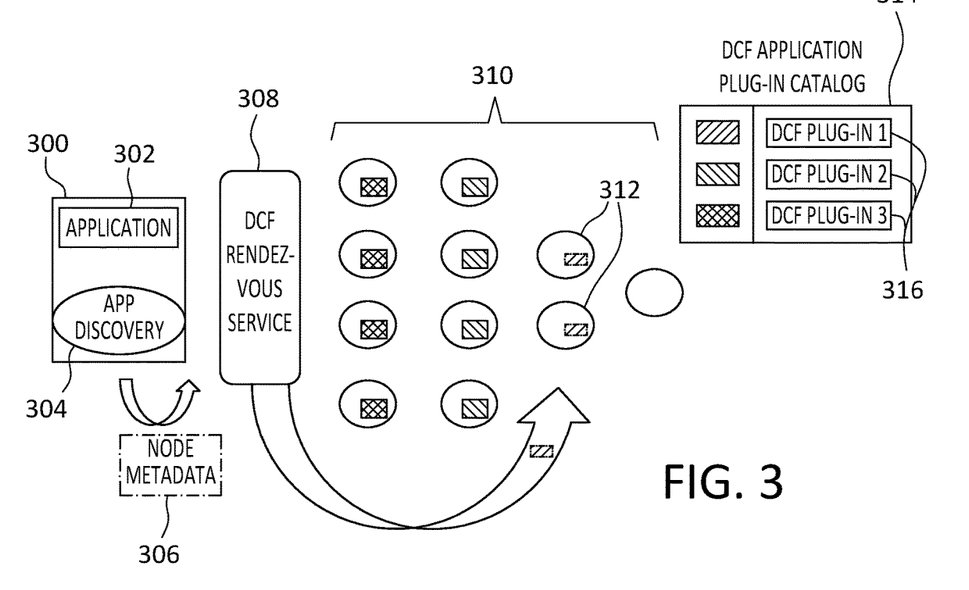
FIG. 3 discloses aspects of an example architecture for deployment of DCF logic to discovered applications.

With reference now to the example of FIG. 3, further details are provided concerning a DCG, such as the DCG 216 for example, and associated update process performed by a DRS, such as the DRS 212 for example. In the example of FIG. 3, a DCF node 300 hosts one or more applications 302 that may interact with, such as by receiving data from, one or more other applications running at other nodes of the DCF. The DCF node 300 may further comprise an instance of an ADA 304 that may operate to intercept traffic directed to the DCF node 300. The traffic may be examined by the ADA 304, and node metadata 306 generated that identifies (i) the node(s) from which the traffic was received and/or through which the traffic has passed, and (ii) the new application that generated the traffic. The node metadata 306 may be passed by the node 300, and specifically the ADA 304, to a DRS 308. The DRS 308 may then update a DCG 310 with the node metadata 306. Particularly, the DRS 308 may update, with the node metadata 306, every node 312 of the DCG 310 where an instance of the new application has been determined to be running.

With continued reference to the example of FIG. 3, an embodiment may comprise a DCF application plug-in catalog, or simply 'plug-in catalog,' 314 that may hold various plug-ins 316 corresponding to respective applications. Note that the plug-in catalog 314 may hold a variety of different plug-ins, such as for (1) applications known to be running in a DCF, (2) 'new' applications, and (3) applications expected to run in the DCF at some point. Thus, a plug-in catalog 314 may be generic, or inclusive, in the sense that it may not be specific to any particular DCF or to any particular set, or subset, of DCF applications. A plug-in 316 for a given application may comprise business logic that is able to annotate, such as with data confidence metadata, data handled in the context of that given application. In an embodiment, these plug-ins 316 may be deployed automatically to a newly discovered application. This deployment may take place after the DCG 310 has been updated by the DRS 308.

C. EXAMPLE METHODS

Figure 4A:
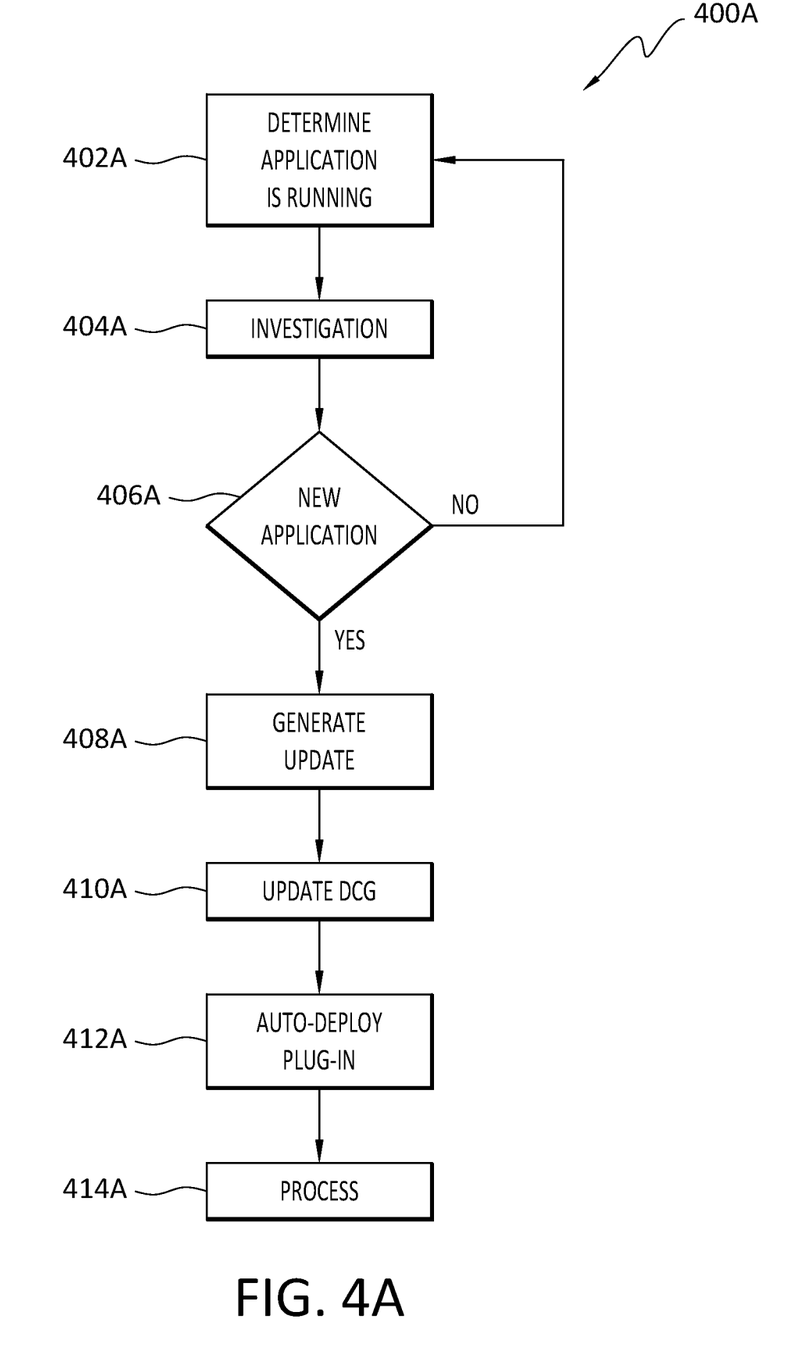
FIG. 4A discloses an example method according to one embodiment.
Figure 4B:
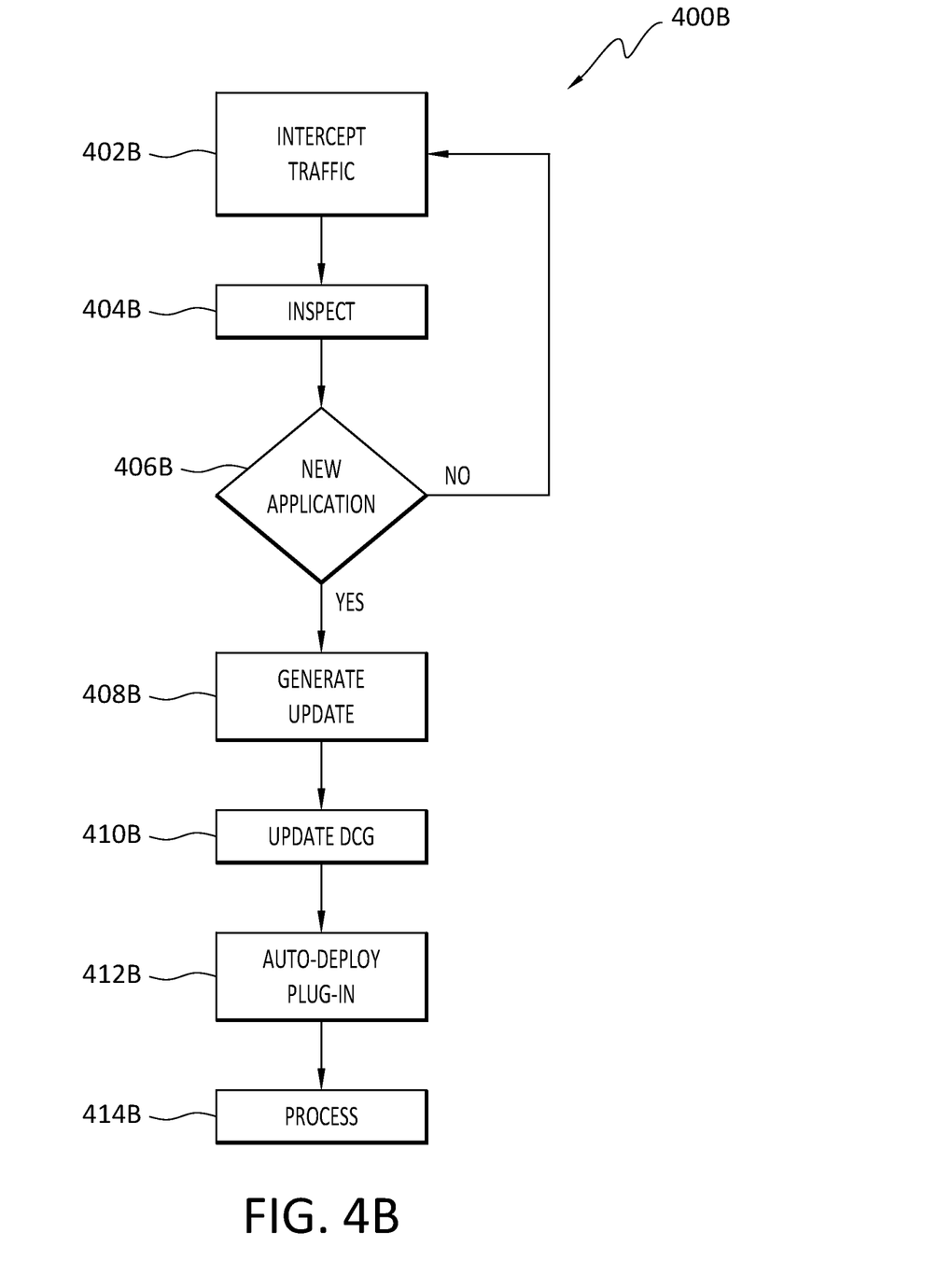
FIG. 4B discloses an example method according to one embodiment.

It is noted with respect to the disclosed methods, including the example method of FIG. 4B, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 4A, a method according to one example embodiment is denoted at 400A. The example method 400A may be performed in whole or in part at one or more nodes of a DCF. In an embodiment, the example method 400A may be performed entirely within a DCF. No particular implementation of the method 400A is required, however.

The example method 400A may begin when a determination is made 402A that an application is running at a node of a DCF. After the determination 402A, an investigation may be performed 402B to determine if the application is new to the DCF. If a check 406A determines that the application is already known to the DCF, the method 400A may return to 402A.

When the check 406A determines that the application is new, an update may be generated 408A that may comprise metadata about the new application and/or data of the new application. The update may then be used to update 410A a DCG. When the DCG has been updated to indicate all the nodes where the new application has been deployed, a respective instance of a plug-in corresponding to that application may be automatically deployed 412A to each of those nodes. The plug-in may comprise protocols, procedures, instructions, and other information, and those may be used by the application to process 414A, such as by annotation with data confidence metadata, data received from the new application.

Directing attention now to FIG. 4B, a method according to one example embodiment is denoted at 400B. The example method 400B may be performed in whole or in part at one or more nodes of a DCF. In an embodiment, the example method 400B may be performed entirely within a DCF. No particular implementation of the method 400B is required, however.

The example method 402B may begin when traffic from an application is intercepted. The intercepted traffic may comprise data packets and metadata transmitted to a node by an application hosted at another node. After the traffic has been intercepted 402B, it may be inspected 404B, and a check 406B performed to determine if the traffic came from an application new to a DCF in which the traffic was generated. If the check 406B determines that the application is already known to the DCF, the method 400B may return to 402B. A check 406B may comprise looking at metadata of the intercepted traffic to determine what application the traffic was transmitted by. Because a node may keep track of known applications, that metadata may be compared with known application metadata to determine whether the application that generated the intercepted traffic is known or not.

If the check 406B determines that the traffic was transmitted by a new application, that may have been newly added to the DCF, then an update may be generated 408B that may comprise metadata about a node that intercepted the traffic, and about the application from which the traffic was received. The update may then be used to update 410B a DCG. When the DCG has been updated to indicate all the nodes where the new application has been deployed, a respective instance of a plug-in corresponding to that application may be automatically deployed 412B to each of those nodes. The plug-in may comprise protocols, procedures, instructions, and other information, and those may be used by the application to process 414B, such as by annotation with data confidence metadata, data received from the new application.

D. FURTHER EXAMPLE EMBODIMENTS

Following are some further example embodiments of the invention. These are presented only by way of example and are not intended to limit the scope of the invention in any way.

Embodiment 1. A method, comprising: determining that an application is running on a node of a data confidence fabric; performing an investigation to determine if the application is new to the data confidence fabric; when it is determined that the application is new to the data confidence fabric, generating an update comprising metadata that identifies the application and the node on which the application is running; and automatically deploying, to the node of the data confidence fabric, an application-specific plug-in configured to annotate data received from the application that was determined to be new to the data confidence fabric.

Embodiment 2. The method as recited in any preceding embodiment, wherein the plug-in is employed by an application running at the node of the data confidence fabric.

Embodiment 3. The method as recited in any preceding embodiment, wherein the plug-in is configured to annotate the data with data confidence metadata.

Embodiment 4. The method as recited in any preceding embodiment, wherein the investigation comprises any one or more of: packet sniffing of network traffic; inspecting local disk traffic for application data; checking a signature on a disk for application information; checking a list of filenames on the node where the application is running to determine that the filenames and/or file extensions correspond to the application; and checking a registry and/or a service catalog to identify applications running on the node.

Embodiment 5. The method as recited in any preceding embodiment, wherein the update is transmitted to a service that is configured and operable to update a data confidence fabric capabilities graph.

Embodiment 6. The method as recited in any preceding embodiment, wherein the update is used to update a data confidence fabric capabilities graph that identifies nodes in the data confidence fabric, and also identifies applications running at those nodes.

Embodiment 7. The method as recited in any preceding embodiment, wherein the update is used to update a data confidence fabric capabilities graph that indicates how data flows from application-to-application within the data confidence fabric.

Embodiment 8. The method as recited in any preceding embodiment, wherein the update is used to update a data confidence fabric capabilities graph so that the data confidence fabric facilities graph indicates every node of the data confidence fabric where the application is running.

Embodiment 9. The method as recited in any preceding embodiment, wherein the investigation comprises intercepting application traffic generated by the application.

Embodiment 10. The method as recited in embodiment 9, wherein the investigating comprises inspecting the application traffic.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

E. EXAMPLE COMPUTING DEVICES AND ASSOCIATED MEDIA

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
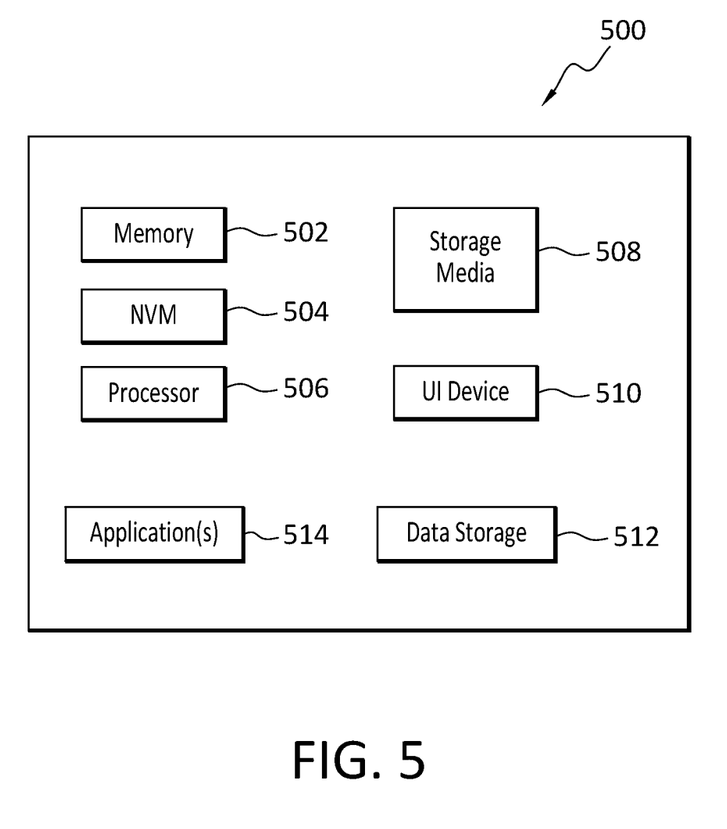
FIG. 5 discloses an example computing entity configured and operable to perform any of the disclosed methods, processes, and operations.

With reference briefly now to FIG. 5, any one or more of the entities disclosed, or implied, by FIGS. 1-4, and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for automatically onboarding, to a data confidence fabric, a new application of which the data confidence fabric was unaware prior to the onboarding, comprising:
    discovering an application running on a node of a data confidence fabric that comprises a group of nodes, which group includes the node, that are operable to assign respective confidence scores to data passing through the nodes or otherwise handled by the nodes;
    performing an investigation to determine if the application is new, wherein the application is deemed as new, or not, based on node metadata of the node where the application is running, to the data confidence fabric;

when it is determined that the application is new to the data confidence fabric, generating an update comprising metadata that identifies the application and the node on which the application is running; and automatically deploying, to the node of the data confidence fabric on which the application is running, an application-specific plug-in configured to annotate data received from the application that was determined to be new to the data confidence fabric.

2. The method as recited in claim 1, wherein the plug-in is employed by an application running at the node of the data confidence fabric.

3. The method as recited in claim 1, wherein the plug-in is configured to annotate the data with data confidence metadata.

4. The method as recited in claim 1, wherein the discovering comprises any one or more of: packet sniffing of network traffic; inspecting local disk traffic for application data; checking a signature on a disk for application information; checking a list of filenames on the node where the application is running to determine that the filenames and/or file extensions correspond to the application; and checking a registry and/or a service catalog to identify applications running on the node.

5. The method as recited in claim 1, wherein the update is transmitted to a service that is configured and operable to update a data confidence fabric capabilities graph.

6. The method as recited in claim 1, wherein the update is used to update a data confidence fabric capabilities graph that identifies nodes in the data confidence fabric, and also identifies applications running at those nodes.

7. The method as recited in claim 1, wherein the update is used to update a data confidence fabric capabilities graph that indicates how data flows from application-to-application within the data confidence fabric.

8. The method as recited in claim 1, wherein the update is used to update a data confidence fabric capabilities graph so that the data confidence fabric facilities graph indicates every node of the data confidence fabric where the application is running.

9. The method as recited in claim 1, wherein the investigation comprises intercepting application traffic generated by the application.

10. The method as recited in claim 9, wherein the investigating comprises inspecting the application traffic.

11. A non-transitory storage medium having stored therein instructions that are executable by one or more hardware processors to perform operations for automatically onboarding, to a data confidence fabric, a new application of which the data confidence fabric was unaware prior to the onboarding, and the operations comprising:

discovering an application running on a node of a data confidence fabric that comprises a group of nodes, which group includes the node, that are operable to assign respective confidence scores to data passing through the nodes or otherwise handled by the nodes;

performing an investigation to determine if the application is new, wherein the application is deemed as new, or not, based on node metadata of the node on which the application is running, to the data confidence fabric;

when it is determined that the application is new to the data confidence fabric, generating an update comprising metadata that identifies the application and the node on which the application is running; and automatically deploying, to the node of the data confidence fabric on which the application is running, an application-specific plug-in configured to annotate data received from the application that was determined to be new to the data confidence fabric.

12. The non-transitory storage medium as recited in claim 11, wherein the plug-in is employed by an application running at the node of the data confidence fabric.

13. The non-transitory storage medium as recited in claim 11, wherein the plug-in is configured to annotate the data with data confidence metadata.

14. The non-transitory storage medium as recited in claim 11, wherein the discovering comprises any one or more of: packet sniffing of network traffic; inspecting local disk traffic for application data; checking a signature on a disk for application information; checking a list of filenames on the node where the application is running to determine that the filenames and/or file extensions correspond to the application; and checking a registry and/or a service catalog to identify applications running on the node.

15. The non-transitory storage medium as recited in claim 11, wherein the update is transmitted to a service that is configured and operable to update a data confidence fabric capabilities graph.

16. The non-transitory storage medium as recited in claim 11, wherein the update is used to update a data confidence fabric capabilities graph that identifies nodes in the data confidence fabric, and also identifies applications running at those nodes.

17. The non-transitory storage medium as recited in claim 11, wherein the update is used to update a data confidence fabric capabilities graph that indicates how data flows from application-to-application within the data confidence fabric.

18. The non-transitory storage medium as recited in claim 11, wherein the update is used to update a data confidence fabric capabilities graph so that the data confidence fabric facilities graph indicates every node of the data confidence fabric where the application is running.

19. The non-transitory storage medium as recited in claim 11, wherein the investigation comprises intercepting application traffic generated by the application.

20. The non-transitory storage medium as recited in claim 19, wherein the investigating comprises inspecting the application traffic.

* * * * *